(12) United States Patent
Oussalem

(10) Patent No.: US 8,294,058 B2
(45) Date of Patent: Oct. 23, 2012

(54) ELECTRIC FORGE FOR HEATING HORSE SHOES

(76) Inventor: Jean Oussalem, Angers (FR)

( * ) Notice: Subject to any disclaimer, the term of this patent is extended or adjusted under 35 U.S.C. 154(b) by 1475 days.

(21) Appl. No.: 11/661,342

(22) PCT Filed: Aug. 24, 2005

(86) PCT No.: PCT/FR2005/002128
§ 371 (c)(1),
(2), (4) Date: Aug. 9, 2007

(87) PCT Pub. No.: WO2006/027457
PCT Pub. Date: Mar. 16, 2006

(65) Prior Publication Data
US 2008/0110864 A1    May 15, 2008

(30) Foreign Application Priority Data

Aug. 27, 2004   (FR) .................................. 04 09182

(51) Int. Cl.
*H05B 3/20* (2006.01)
*A01L 11/00* (2006.01)
*B21K 15/02* (2006.01)

(52) U.S. Cl. ........................................... 219/50

(58) Field of Classification Search ................. None
See application file for complete search history.

(56) References Cited

U.S. PATENT DOCUMENTS

| 1,693,271 | A | * | 11/1928 | Dannell | 219/150 R |
| 1,718,364 | A | * | 6/1929 | Kobert | 219/150 R |
| 1,744,284 | A | * | 1/1930 | Speed | 219/56 |
| 3,664,428 | A | * | 5/1972 | Spencer | 168/4 |
| 3,921,721 | A | * | 11/1975 | George | 168/4 |
| 4,916,288 | A | * | 4/1990 | Redden | 219/228 |
| 6,091,056 | A | * | 7/2000 | Kannan et al. | 219/390 |
| 2002/0167781 | A1 | * | 11/2002 | Matsuki et al. | 361/234 |
| 2004/0025382 | A1 | * | 2/2004 | Walther | 38/77.83 |
| 2005/0217870 | A1 | * | 10/2005 | Kolonia | 168/4 |

FOREIGN PATENT DOCUMENTS

FR        2853805  A1  * 10/2004

* cited by examiner

*Primary Examiner* — Kiley Stoner

(57) ABSTRACT

The invention relates to a device for electrical resistance heating (1), said device being used to heat a metallic mass (3), such as horse shoes and the like, at a sufficiently high temperature for forging, and over a sufficiently short period of time to be able to meet the requirements of the job. As a substitute for gas, the inventive device offers the user a significant economical advantage, a higher level of safety, and improved working conditions.

6 Claims, 1 Drawing Sheet

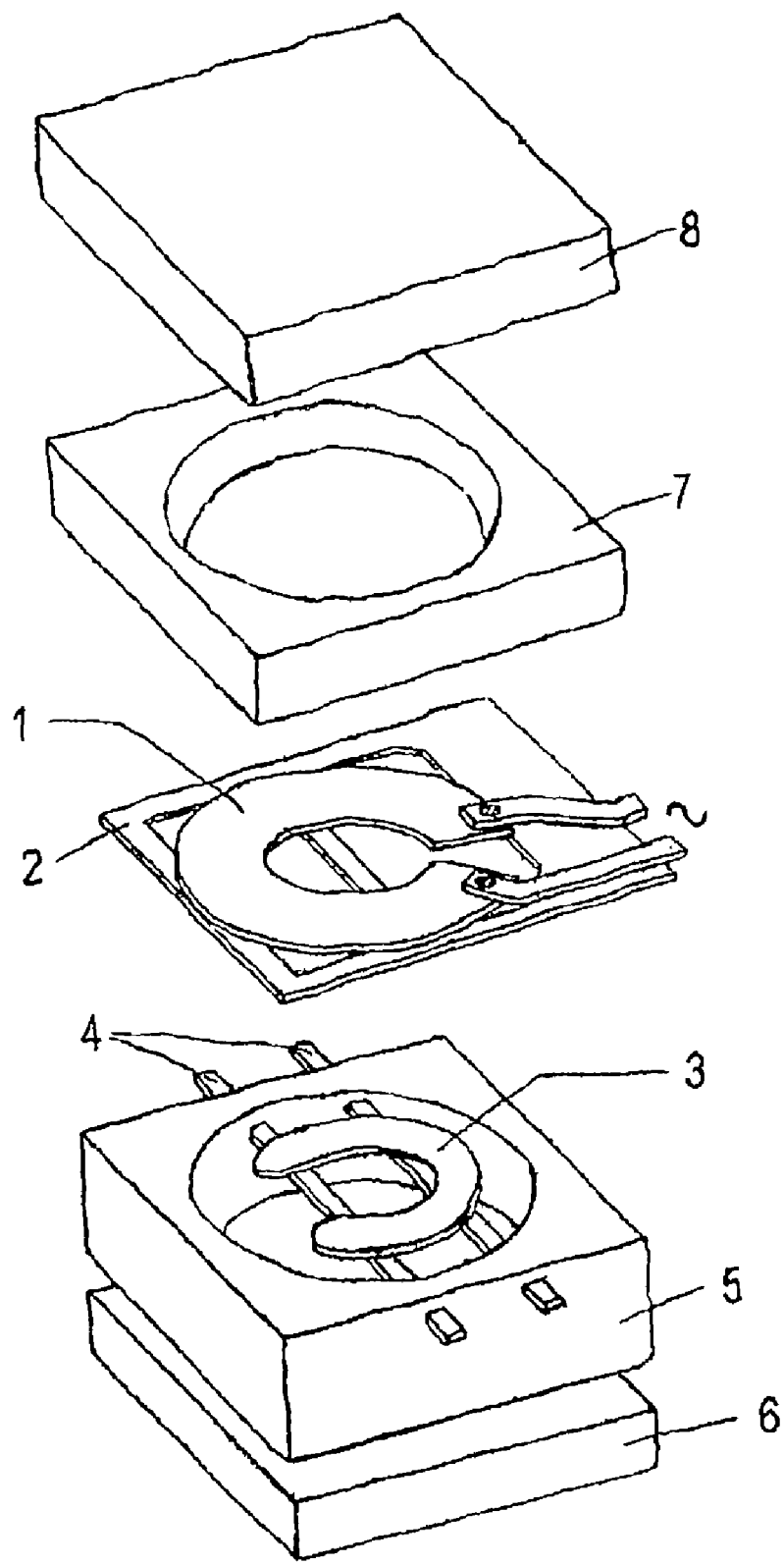

ELECTRIC FORGE FOR HEATING HORSE SHOES

The present invention concerns a device for heating by electric element intended to heat a metal mass such as one or more horseshoes and the like, to a sufficient temperature to be forged (approximately 1000° C.), and in a sufficiently short time to meet the requirements of the trade, in particular, of farrier.

BACKGROUND OF THE INVENTION

Traditionally, horseshoes are heated in a transportable gas forge. Because the shoeing takes place on site, the farrier is obliged to transport all his equipment, namely:
- forge, anvil and tools,
- range of different sizes of shoe,
- miscellaneous portable electrical equipment,
- two gas bottles (the need to have available a recharge).

The transportation of gas bottles in a vehicle presents certain risks that are not covered by insurance unless equipped with a strong sealed box, of given dimensions and thicknesses, fixed outside the vehicle. Such compliance with safety standards proves unsuitable for the majority of users, who have lightweight vehicles of the van type. All the more so since it represents a prohibitive cost. Thus, in reality, only a very small minority of farriers work in complete conformity.

Gas forges have other major drawbacks that are added to already difficult working conditions. Such as the noise generated by the burners, which stress some horses to the point of preventing any work.

When it is necessary to take the shoes out of the fire, extreme heat causes burns to the hands and arms, the use of gloves not being very compatible with the activity. The flame of the gas forge is oxidising. At high temperature, it rapidly produces a great deal of scale (iron oxide vapours). Prolonged exposure to these gaseous emissions causes respiratory and cardio-vascular complications in some people.

From the economic point of view, the energy balance of a gas forge in its current design may be considered disastrous. This is because the very operating principle requires the continuous discharge of burnt gases, and therefore heat. Thus, out of all the energy consumed, the part actually absorbed by the loads scarcely exceeds 10%.

SUMMARY OF THE INVENTION

The device according to the invention makes it possible to remedy these many drawbacks by using heating by electrical element, whose efficiency is close to 100% (the losses being essentially of a thermal nature).

The energy balance of the electrical device is indisputably much superior. The element/shoe assembly being thermally insulated by low-density insulating materials, a very large part of the energy is transmitted to the load. The user is no longer obliged to transport gas bottles since he has electrical energy available directly at the place of work. In addition, and unlike gas, the energy cost is paid by the client.

By way of comparison, the cost of heating shoes electrically is approximately one-fifth of that of gas.

The principle of the invention consists of substituting electrical energy for gas, using a high-temperature electric element (1000 to 1200° C.), disposed closed to the shoe to be heated. Since the requirements of the trade involve reaching the required temperature in a time of around a few minutes and with a limited electrical source (220V-16 A), the efficiency must be optimised to the maximum. To arrive at a satisfactory result, the shoe and element are contained in an advantageously small space and disposed as close as possible to each other without coming into contact. The said space is delimited by a low-density insulating material so as to absorb the minimum heat, contains a volume consisting in particular of air serving to transfer the heat by convection and radiation. The internal walls of the said space have a reflective surface so as to optimise the radiation heat exchanges by concentrating the latter.

In addition, the profile of the walls is determined so as to optimise the convection currents all around the element and shoe.

BRIEF DESCRIPTION OF THE DRAWINGS

The accompanying drawings illustrate the invention:

FIG. 1 depicts the device of the invention in perspective.

With reference to FIG. 1, the device comprises an electric element (1), placed on an electrically insulating support (2) which is brought close to the horseshoe (3) placed on a support (4). The stacked elements (5) and (7) form a small space, closed by the elements (6) and (8). The space thus formed contains the electric element (1) and the horseshoe (3). The gas, in particular air, also contained in the said space serves to transport the heat from the element to the mass to be heated.

In order to optimise the convection movements giving rise to the transfer of heat, the volume delimited by the insulating material is determined in an advantageously restricted manner and with a specific profile. In addition, the internal walls of the said volume have a reflective surface intended to amplify the thermal radiation in order to optimise the transfer of heat.

The insulating materials used are of low density in order to absorb a minimum amount of heat and offer better efficiency.

A thermal sensor, for example of the thermocouple type, enables the temperature to be regulated by interrupting the power supply once the temperature is reached. In the case of heating aluminium shoes, for example, where the required temperature is lower, a switch makes it possible to switch onto an intermediate circuit controlling the regulation.

The device according to the invention is in particular intended for farriers.

The invention claimed is:

1. A resistance heating device intended to heat a metal mass of at least one horseshoe (3), characterised in that it comprises an electric element (1), placed on an electrically insulating support (2), a support (4) for the said horseshoe (3), stacked elements (5, 7) made from insulating material delimiting a volume in which the electric element (1) and the support (4) are disposed, the stacked elements (5, 7) closed by other stacked insulating elements (6, 8).

2. A resistance heating device according to claim 1, characterised in that internal walls of the said volume have a reflective surface intended to optimise the heat exchanges by radiation.

3. A resistance heating device according to claim 1, characterised in that an internal profile of the internal volume delimited by the insulating material is determined so as to optimise the convection currents around the mass to be heated.

4. A resistance heating device according to claim 1, characterised in that the insulating material has a density as low as possible so as to minimise thermal losses.

5. A resistance heating device according to claim 1, characterised in that the device comprises a thermal sensor intended to cut off electrical supply in order to regulate heating temperature.

6. A resistance heating device according to claim 5, characterised in that the device is provided with a switch for switching onto an intermediate circuit controlling regulation.

* * * * *